Dec. 2, 1941.  S. B. KRAUT ET AL  2,264,705
DRAINAGE VALVE FOR LUMINAIRES
Filed Feb. 21, 1940

WITNESSES:

INVENTORS.
Samuel B. Kraut and
Edward A. McVein.
BY
ATTORNEY

Patented Dec. 2, 1941

2,264,705

UNITED STATES PATENT OFFICE 2,264,705

DRAINAGE VALVE FOR LUMINAIRES

Samuel B. Kraut, Cleveland Heights, and Edward A. McVein, Cleveland, Ohio, assignors to Westinghouse Electric & Manufacturing Company, East Pittsburgh, Pa., a corporation of Pennsylvania Application February 21, 1940, Serial No. 320,088

4 Claims. (Cl. 240—25)

Our invention relates, generally, to lighting fixtures or luminaires and, more particularly, to valve means for ventilating the interiors of luminaires of the enclosed type, which shall function to effect drainage of accumulated moisture therefrom and effectively prevent the entrance of bugs and insects into the interiors thereof.

Heretofore, difficulty has been experienced in designing outdoor luminaires of the totally enclosed type which will effectively operate under all weather conditions without accumulating excessive moisture within the interiors of the units.

Such luminaires have been purposely so constructed as to exclude moisture but it has been found that, under conditions of changing temperatures, particularly in damp and rainy weather, moisture accumulates in the bottoms of the globes by reason of a breathing action thereof.

While such accumulation of moisture may be drained from the unit through an opening in the bottom of the globe, refractor or other enclosing glassware, such opening attracts bugs and insects and permits ready access of the bugs and insects to the inside of the globe where they are killed and accumulate.

Various attempts have been made to cover the opening in the bottom of the globe, such as by a fine-mesh screen, but that has not been satisfactory for the reason that the mesh of the screen must be extremely fine to exclude all insects and the accumulated moisture does not readily pass through such a screen, because of surface tension. The screen, also, does not eliminate the bright spot in the bottom of the globe and insects are attracted as in the case of the unscreened opening.

Further, experience has shown that spray from beating rain will penetrate the interiors of luminaires having unscreened or screened openings therein; with resulting damage to the lamps, since such spray may cause explosion of a hot 10,000 lumen lamp.

Accordingly, it is the object of our invention, generally stated, to provide a valve device for use with globes, refractors or other enclosing elements of enclosed luminaires which shall allow for ready drainage of accumulated moisture from the interiors thereof and prevent the entrance of insects into the globes or units, which shall be of simple and economical construction and which may be readily applied to old or new units of that general type.

A more specific object of our invention is to provide for the effective drainage of accumulated moisture from the interior of an enclosed luminaire through an unobstructed opening in the globe which does not create a bright spot on the globe or other part of the unit to attract insects.

A further object of our invention is to provide a simple and inexpensive valve device for the drainage opening in the bottom of a luminaire which functions to effectively close the opening against the emission of light without obstructing the passage of moisture therethrough, thereby eliminating any bright spot for the attraction of insects and creating a dark spot to which insects are not attracted, without interfering with the proper drainage of any accumulated moisture from the unit.

Another object of our invention is to provide a valve device having an aperture of such size at the narrowest point that the largest drop which surface tension of water permits to be stable at 10 degrees centigrade, for example, will not be held supported against gravity by adhesion of the water to the wall of the aperture.

A still further object of our invention is to provide a valve device that will prevent the penetration of spray from beating rain to the interiors of luminaires.

These and other objects of our invention will become more apparent from the following detailed description of one embodiment thereof, when considered in conjunction with the accompanying drawing, in which.

Figure 1:
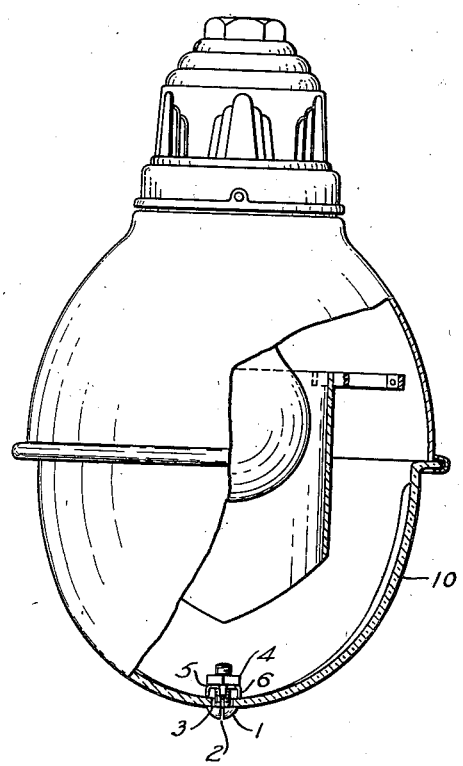
Figure 1 is a view, in side elevation, partly in section, of an enclosed luminaire showing the application thereto of our valve.

Since the enclosed luminaire shown in Fig. 1 is not in itself a part of our present invention, a detailed description thereof is unnecessary. Suffice to say that it is necessary for the efficient operation of such units to protect the interiors thereof against the ravages of the elements and to provide adequate drainage and ventilating means and eliminate openings that attract and give access to bugs and insects.

In practicing our invention in its preferred form, the globe, refractor or other enclosing part of the luminaire which is to be drained, protected and ventilated, is provided with an opening which is covered by a valve device constructed in such manner that it functions to permit free drainage of any accumulated moisture from the interior of the globe, provides ventilating means and protection from the entrance of spray from rain to the interior of the globe, and effectively screens the opening against the emission or discharge of light which would otherwise create a bright spot to attract insects to and through the drainage opening.

Figure 2:
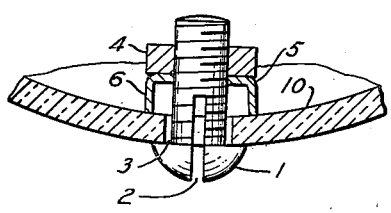
Fig. 2 is an enlarged view, partly in section, of the valve device and a portion of the globe shown in Fig. 1.
Figure 3:
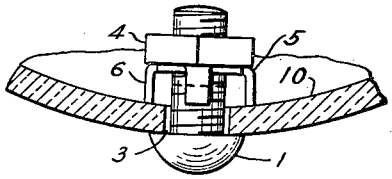
Fig. 3 is a similar view with the valve fastening means turned an angle of 90 degrees from the position shown in Fig. 2.
Figure 4:
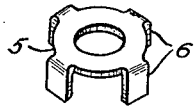
Fig. 4 is a perspective view of the crimp washer which is a part of our invention.

Referring to the drawing, the valve device in its preferred form may comprise a headed screw member 1 having a deep longitudinal slot 2 so cut through the head into the screw body that, when the screw is placed within the opening in the globe 10, with its head on the outside, the slot 2 extends above the inner surface of the globe, as shown in Fig. 2. The screw 1 is preferably of smaller diameter than the opening in the globe to form an annular passage 3 therebetween and is retained in position by a nut 4 in threaded engagement with the end of the screw 1 and which bears on a crimped washer 5 interposed between the nut 4 and the bottom of the globe 10. The washer 5 (Fig. 4) has spaced downturned portions 6 which space the flat portion thereof above the bottom of the globe and provide a plurality of openings through which the moisture may pass into the annular passage 3 between the screw 1 and the sides of the opening in the globe 10 and out through the slot 2 in the screw 1.

It will be apparent that even though the slot 2 may be of narrow width, it provides a drainage passage having a relatively large effective area or cross-section as it extends entirely across the head of the screw 1, thereby providing an extended outlet for the escape of moisture.

It is to be understood that any other suitable arrangement of parts may be utilized than the particular arrangement described so long as it functions to effectively close the drainage opening against the entrance of insects, the emission of any appreciable amount of light and still provide a relatively unrestricted passage through which any moisture, which collects within the luminaire due to breathing or otherwise, is readily drained therefrom. The embodiment of the invention shown and described is simple and inexpensive to produce and install in old and new luminaires for the reason that it is comprised of a combination of parts which are readily obtainable and require only a relatively small amount of changing or processing to adapt them for use in the manner disclosed.

It will thus be seen that we have provided an efficient, inexpensive, easily installed valve device for ventilating the interiors of globes of luminaires, for providing for drainage of accumulated moisture therefrom, for preventing penetration of spray from rain thereto, and for effectively preventing entrance of bugs and insects into the interiors of the globes.

Further, the valve device of our invention eliminates the bright spot heretofore present in the globes of luminaires provided with drainage and ventilation means, which bright spot attracted bugs and insects. Instead, our valve device creates a dark spot at the opening in the globe and bugs and insects are not attracted thereto.

While, for the purpose of illustration, we have shown the preferred form of our invention as applied to a luminaire of the enclosed type, it is to be understood that the valve device is susceptible of other applications. Therefore, it is not our purpose to limit ourselves strictly to the exact details herein illustrated and described, since modifications may be made without departing from the spirit of the invention, as defined in the appended claims.

We claim as our invention:

1. In an enclosed luminaire, a globe provided with an opening, means for ventilating and providing for drainage of liquid from the interior of the globe comprising a screw member having a threaded body portion of a diameter smaller than the diameter of the opening in said globe to form an annular passage therebetween and a head portion of a diameter greater than the diameter of said opening, said screw member having a longitudinal slot extending through the head thereof to a point beyond the inner surface of said globe, a crimp washer having downturned portions through which the screw member extends and having the downturned portions thereof in engagement with the inner surface of said globe, and a nut disposed on the threaded body portion engaging the upper flat portion of said crimp washer to retain the downturned portions of said crimp washer and the head of said screw member in engagement with said globe.

2. In a luminaire, the combination with a globe having an aperture therein, means adapted to fill the aperture except for a passage of limited area comprising a screw-threaded member with a restricted passage from the exterior to a point beyond the interior of said globe, a washer with downturned portions, said downturned portions engaging the inner surface of the globe, and a nut on said screw-threaded member, said nut, when tightened, securely fastening the downturned portions of the washer and the head of the screw-threaded member to the globe.

3. In an enclosed luminaire, the combination with a globe having a ventilating and drainage-opening therein, a closure-member for said opening having a head portion larger than the diameter of said opening and a body portion of a diameter smaller than the diameter of said opening whereby, when the body portion of the closure-member is inserted in said opening, an annular passage is formed between the rim of the opening and the body of the closure-member, said closure-member having a longitudinal slot extending from its head portion through its body portion to a point beyond the inner surface of the globe to provide an unobstructed passage of restricted area from the interior to the exterior of the globe, fastening means on the end of the closure-member opposite its head portion to secure the closure-member to the globe, and spacing means disposed between said fastening-means and the globe, said spacing means having a plurality of spaced downturned portions engaging the inside of the globe around the opening to provide a plurality of inlet passages for the annular passage formed by the closure-member.

4. In an enclosed luminaire, the combination with a globe having a ventilating and drainage-opening therein, a closure-member for said opening having a head portion larger than the diameter of said opening and a body portion of a diameter smaller than the diameter of said opening whereby, when the body portion of the closure-member is inserted in said opening, an annular passage is formed between the rim of the opening and the body of the closure-member, said closure-member having a longitudinal slot extending from its head portion through its body portion to a point beyond the inner surface of the globe to provide an unobstructed passage of restricted area from the interior to the exterior of the globe, said passage at its narrowest point being of such size that the largest drop which surface tension of water permits to be stable will not be held supported against gravity by adhesion of water to the wall of the aperture, adjustable fastening means attached to the end of the body portion of the closure-member within the globe, and a spacing member interposed between the fastening means and globe, said spacing member having a transverse portion engaging the fastening means and a plurality of downturned lug portions with spaces therebetween engaging the inside of the globe to provide passages connecting the annular passage with the interior of the globe.

SAMUEL B. KRAUT.
EDWARD A. McVEIN.